United States Patent
Schürmann et al.

(10) Patent No.: US 10,953,704 B2
(45) Date of Patent: Mar. 23, 2021

(54) PNEUMATIC VEHICLE TIRE

(71) Applicant: Continental Reifen Deutschland GmbH, Hannover (DE)

(72) Inventors: Oliver Schürmann, Langenhagen (DE); Andreas Tyburski, Ilsede (DE)

(73) Assignee: Continental Reifen Deutschland GmbH, Hannover (DE)

( * ) Notice: Subject to any disclaimer, the term of this patent is extended or adjusted under 35 U.S.C. 154(b) by 334 days.

(21) Appl. No.: 15/771,422

(22) PCT Filed: Aug. 22, 2016

(86) PCT No.: PCT/EP2016/069759
§ 371 (c)(1),
(2) Date: Apr. 27, 2018

(87) PCT Pub. No.: WO2017/076531
PCT Pub. Date: May 11, 2017

(65) Prior Publication Data
US 2020/0254828 A1  Aug. 13, 2020

(30) Foreign Application Priority Data
Nov. 5, 2015  (DE) .................... 10 2015 221 698.5

(51) Int. Cl.
  *B60C 19/12*  (2006.01)
  *B29C 73/16*  (2006.01)
  *B60C 19/00*  (2006.01)
  *B29D 30/06*  (2006.01)

(52) U.S. Cl.
  CPC ............ *B60C 19/122* (2013.01); *B29C 73/16* (2013.01); *B29D 30/0685* (2013.01); *B60C 19/002* (2013.01)

(58) Field of Classification Search
  CPC ....... B60C 19/00; B60C 19/002; B60C 19/12; B60C 19/122; B29D 30/0685; B29D 2030/0686; B29D 2030/0695; B29D 2030/0697
  See application file for complete search history.

(56) References Cited

U.S. PATENT DOCUMENTS

| | | |
|---|---|---|
| 2010/0038005 A1 | 2/2010 | Aoki |
| 2010/0270101 A1 | 10/2010 | Yukawa |
| 2012/0073717 A1 | 3/2012 | Agostini et al. |
| 2017/0015146 A1 | 1/2017 | Tyburski et al. |

FOREIGN PATENT DOCUMENTS

| | | | |
|---|---|---|---|
| CN | 102320220 | * | 1/2012 |
| DE | 19750229 A1 | | 6/1999 |
| DE | 102007028932 | * | 12/2008 |

(Continued)

*Primary Examiner* — Justin R Fischer
(74) *Attorney, Agent, or Firm* — David L. Cate; Gregory Adams

(57) ABSTRACT

The invention relates to a pneumatic vehicle tire with a material ring (10) inside it, adhesively attached to the inner surface opposite from the tread (1), the material ring (10) adhering to a self-sealing sealant (8), which at least immediately after its application has a tackiness required for the adhesive attachment of the material ring (10).
To improve the sealing effect, the material ring (10) arranged on the sealant (8) is closed-cell and airtight.

11 Claims, 6 Drawing Sheets

(56) References Cited

FOREIGN PATENT DOCUMENTS

| | | | |
|---|---|---|---|
| DE | 102014206009 | A1 | 10/2015 |
| JP | 2004082947 | A | 3/2004 |
| JP | 200482947 | A | 11/2004 |
| JP | 2005262921 | A | 9/2005 |
| JP | 2012111382 | A | 6/2012 |

* cited by examiner

Stand der Technik

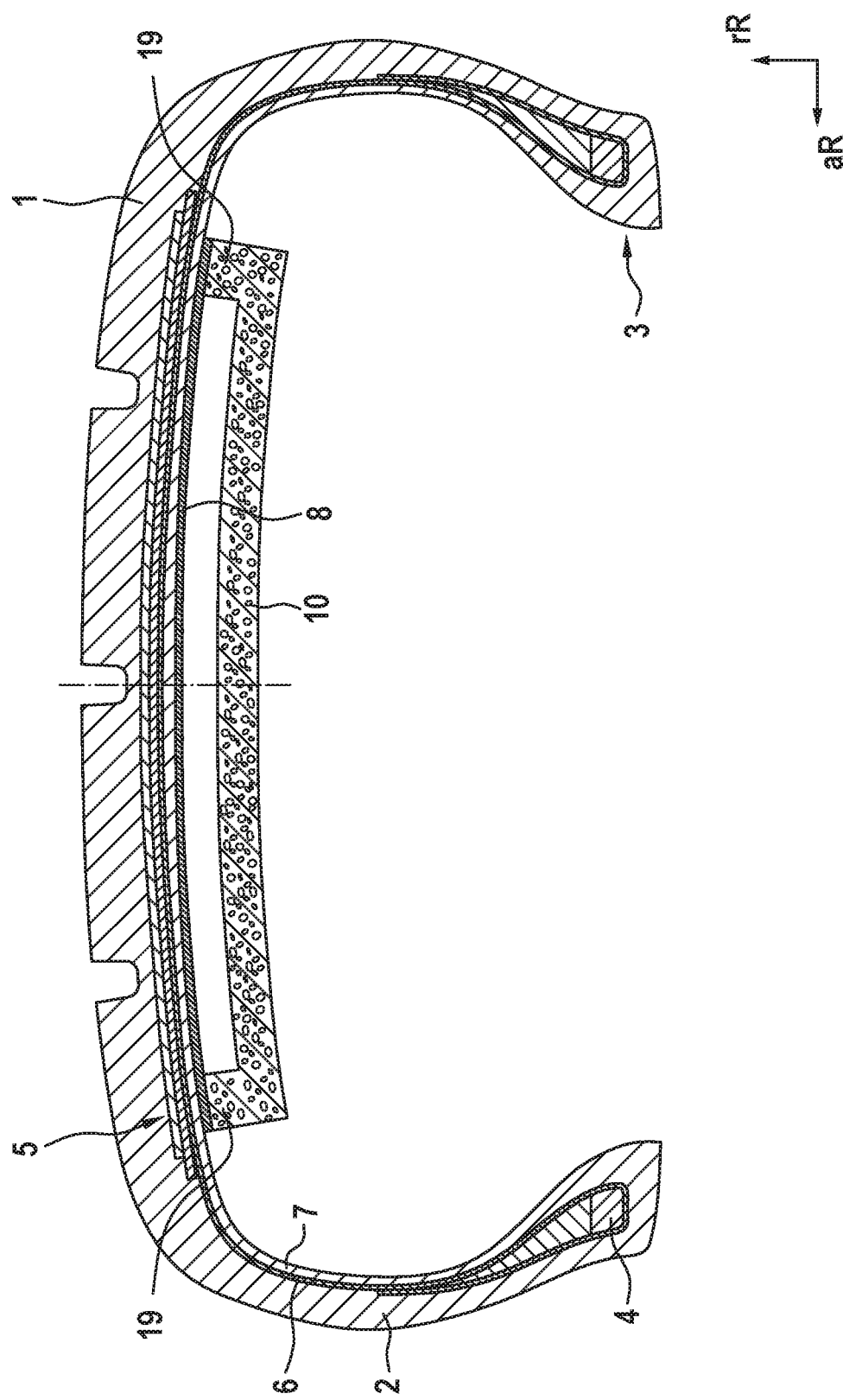

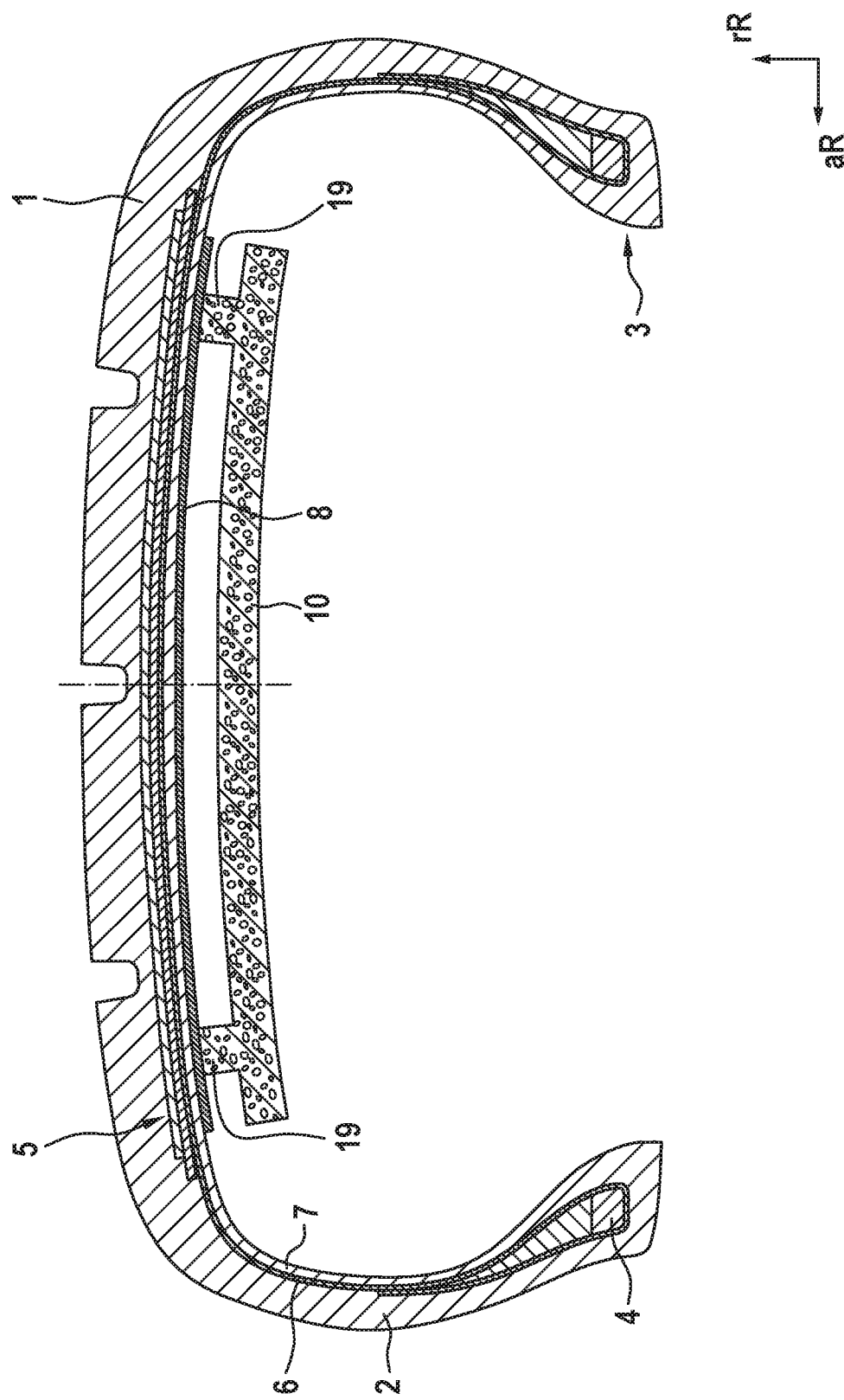

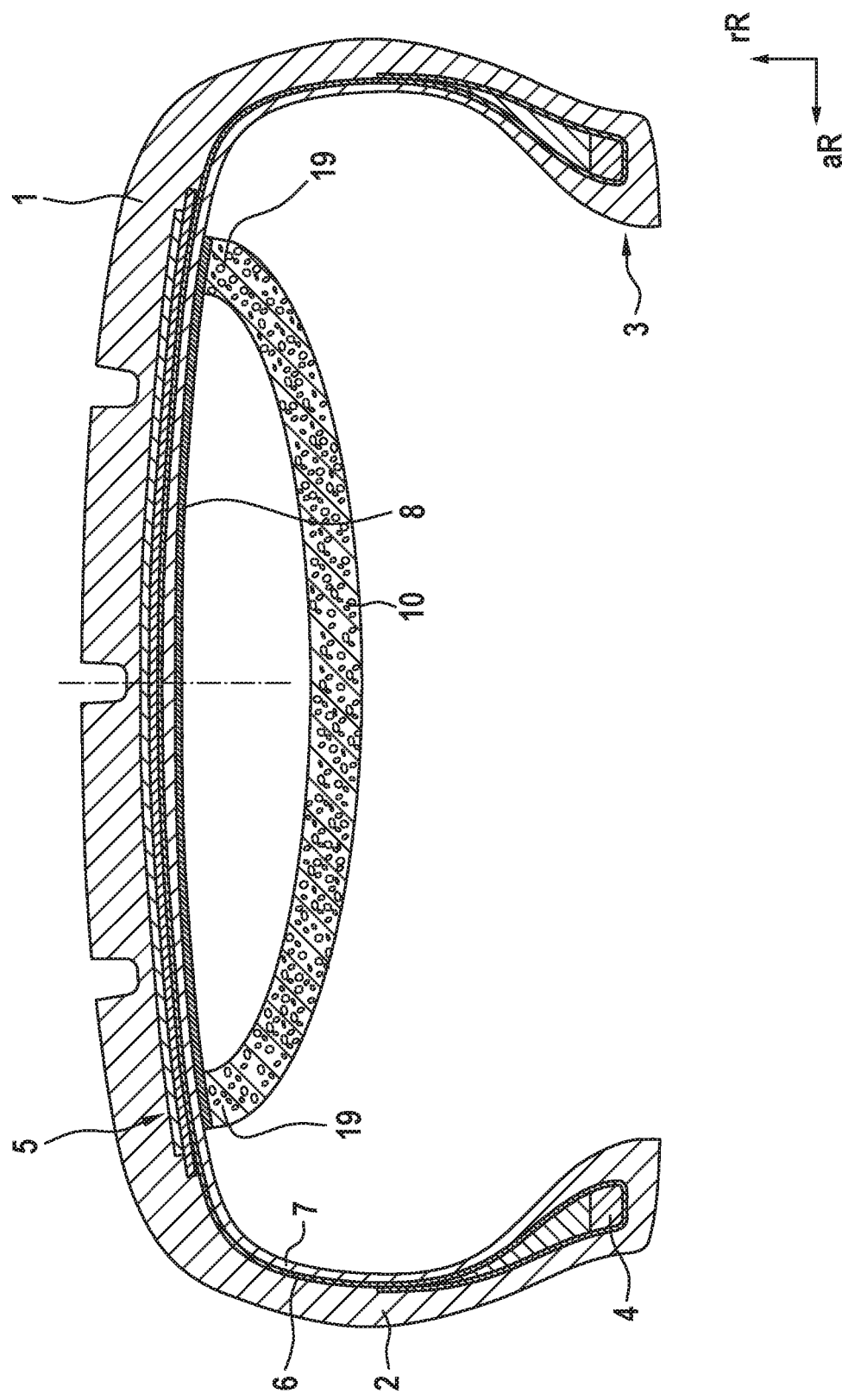

PNEUMATIC VEHICLE TIRE

The invention relates to a pneumatic vehicle tire with a material ring inside it, adhesively attached to the inner surface opposite from the tread, the material ring adhering to a self-sealing sealant, which at least immediately after its application has a tackiness required for the adhesive attachment of the material ring.

Such a pneumatic vehicle tire is known from DE 10 2007 028932 A1. The material ring is a ring composed of open-cell foam which reduces the vibration of air in the tire and leads to an improvement in the noise conditions in the vehicle. The foam ring is also referred to as an "inner absorber". The sealant that is subsequently applied to the inner side of the tire after the operation of heating the tire has two functions: it seals an undesired puncture of the tire in the region of the tread, in that in the event of damage to the inner layer the viscous sealant flows into the location of the damage. Moreover, the sealant serves at the same time as an "adhesive agent" for securing the sound-absorbing foam ring.

The flow characteristics of the sealant may be adversely affected by components lying on the sealant, meaning that the desired sealing effect only occurs after a delay or not at all. In cases in which the penetrating foreign body comes out of the tire again and leaves a large air channel, reliable sealing by the sealant adversely affected in terms of its flow characteristics is particularly difficult.

It is an object of the invention to improve the sealing of the tire in the event of punctures.

The object is achieved according to the invention by the material ring arranged on the sealant being closed-cell and airtight.

According to the invention, the ring of closed-cell and airtight material lying directly on the sealant provides an airtight seal in the event of a puncture. This additional sealing of the material ring has the effect of ensuring the sealing effect of the tire in cases of punctures in spite of the sealant having adversely affected flow characteristics. In the regions in which the flow characteristics of the sealant are not adversely affected by a material ring lying on it, the sealant continues as before to provide a reliable seal.

It is advantageous if the closed-cell material ring consists of foam or of cork or of elastomer or of a combination of the aforementioned materials. It is important that the aforementioned materials are lightweight, that is to say have a low relative density, and have an airtight or largely airtight effect.

It is expedient if the closed-cell material ring is covered with a covering film.

It is expedient if the closed-cell material ring and the covering film are bonded to one another by means of an adhesive. This prevents the components from slipping during fitting or during operation.

It is expedient if the closed-cell material ring has a maximum radial thickness of ≤50 mm, preferably a radial thickness of 20 mm to 40 mm. Most of all puncturing foreign bodies are smaller than 35 mm.

It is advantageous if the covering film has a thickness of 10 μm to 2 mm. Air impermeability even under flexural fatigue stress and sufficient robustness during the fitting of the tire onto the rim are also advantageous.

Possible in the context of the invention are all sealants which self-seal and are sufficiently tacky, at least immediately after application to the inner surface of the tire, for the material ring to be able to be pressed on and to be thus adhesively bonded with the sealant. Therefore, sealants based on polyurethane or sealants that are a viscous mixture based on a butyl rubber, a polybutene or based on silicone are for example suitable.

Suitable as a material for the covering film are rubber, butyl rubber, and various polymers, such as for example polyester, polyurethane, polyamide, polyethylene, polypropylene, polyvinyl chloride, polystyrene, biopolymers, for example nitrocellulose or celluloid.

In one embodiment of the invention, the closed-cell material ring lies with its radially outer surface fully flush on the sealant, the width of the closed-cell material ring preferably corresponding approximately to the width of the sealant. The width of the covering film is preferably greater than that of the material ring and of the sealant and is possibly bonded to the inner layer of the tire.

In another embodiment of the invention, the closed-cell material ring is supported on the sealant by means of two or more supports.

It is advantageous if the layer thickness of the sealant in those regions in which the closed-cell material ring lies directly on the sealant is ≤2 mm, preferably ≤1 mm, while the layer thickness of the sealant in those regions in which the closed-cell material ring does not lie directly on the sealant is greater, for example 2-8 mm. In those regions in which the closed-cell material ring lies on the sealant, the latter can be reduced in its thickness, which has an advantageous effect on the production costs of the tire. In those regions in which no material ring lies on the sealant, the flow characteristics of the viscous sealant are unaffected and a reliable seal in the event of punctures is with its usual thickness of provided 2-8 mm.

It is expedient if the supports are arranged in the circumferential direction of the tire or transversely to the circumferential direction of the tire, or diagonally, continuously or discontinuously. A distribution of the forces in the circumferential or transverse direction and an optimized flexural fatigue strength are advantageous.

Further features, advantages and details of the invention will now be described in more detail on the basis of the drawings, which illustrate schematic exemplary embodiments. In the drawings.

FIGS. 4-6 respectively show cross sections of tires according to the invention, in which the material ring is supported on the sealant by supports.

Figure 1:
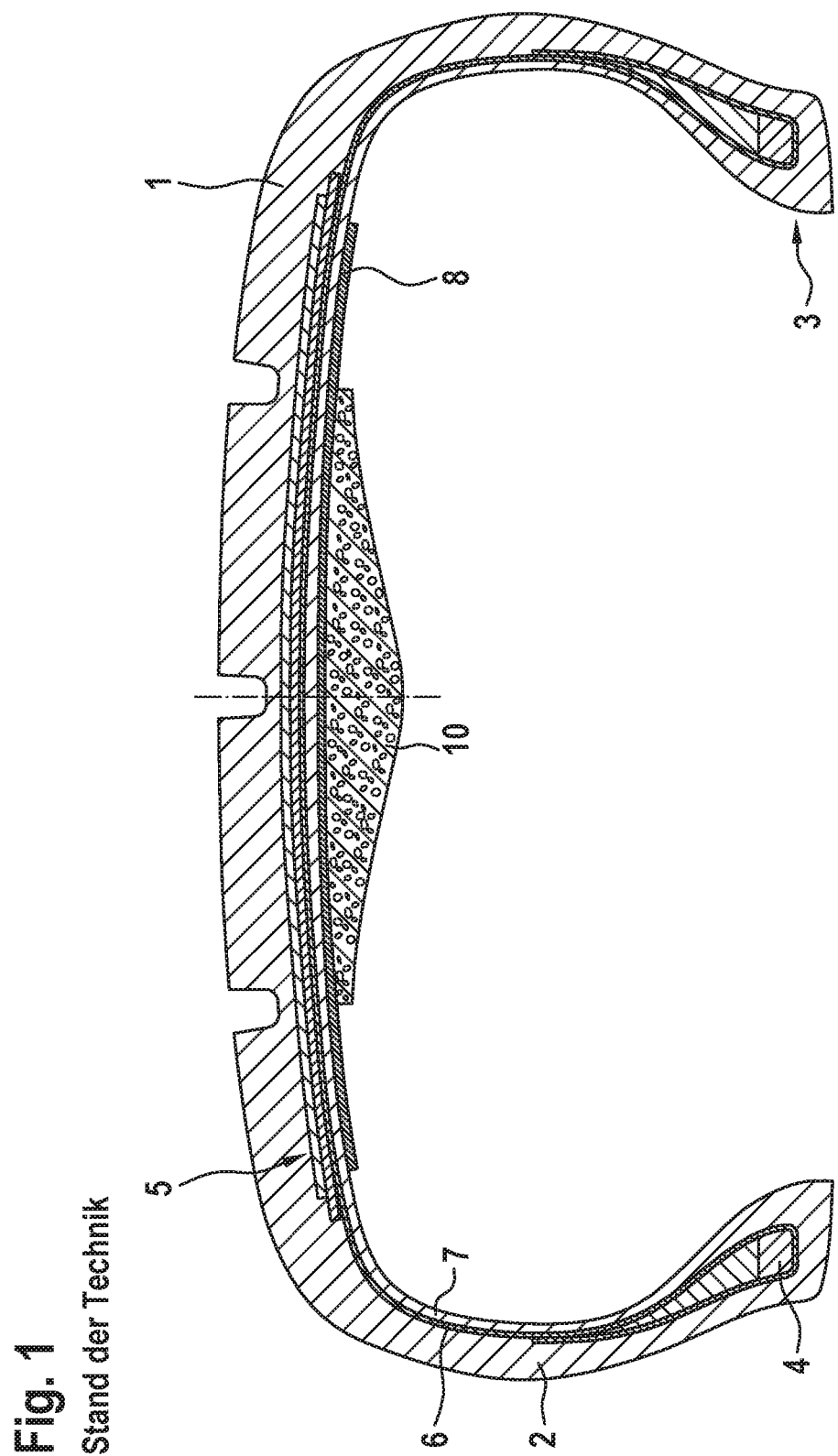
FIG. 1 shows a cross section through a pneumatic vehicle tire of the prior art.

FIG. 1 depicts a cross section through a radial passenger motor vehicle tire having a profiled tread 1, sidewalls 2, bead regions 3, bead cores 4 and also a multi-ply belt assembly 5 and a carcass insert 6. On its inner surface, the tire is covered with an inner layer 7 of an airtight rubber compound. On the inner surface of the inner layer 7 opposite from the tread 1, a sealant 8 that is capable of acting in a self-sealing manner in the event of a puncture—damage to the tire—is subsequently applied (to the finished tire). Possible sealants are, for example, polyurethane gels or viscous mixtures based on butyl rubbers, polybutenes or silicone, it being possible for the mixtures to contain the customary further constituents, such as plasticizer oils. The sealant is introduced, for example by spraying, such that it covers at least the inner surface situated opposite the tread 1.

Inside the tire, on the inner surface opposite from the tread 1, a material ring 10 is adhesively attached. The material ring 10 adheres to the self-sealing sealant 8. The material ring 10 consists of open-cell foam and serves as a sound absorber. The tire can be rotated in order to optimally distribute the sealant on the inner surface. Furthermore, the sealant is introduced in such an amount that the layer thickness of the sealant is between 0.5 mm and 8 mm. At least immediately after application, the sealant should be relatively liquid and tacky.

Figure 2:
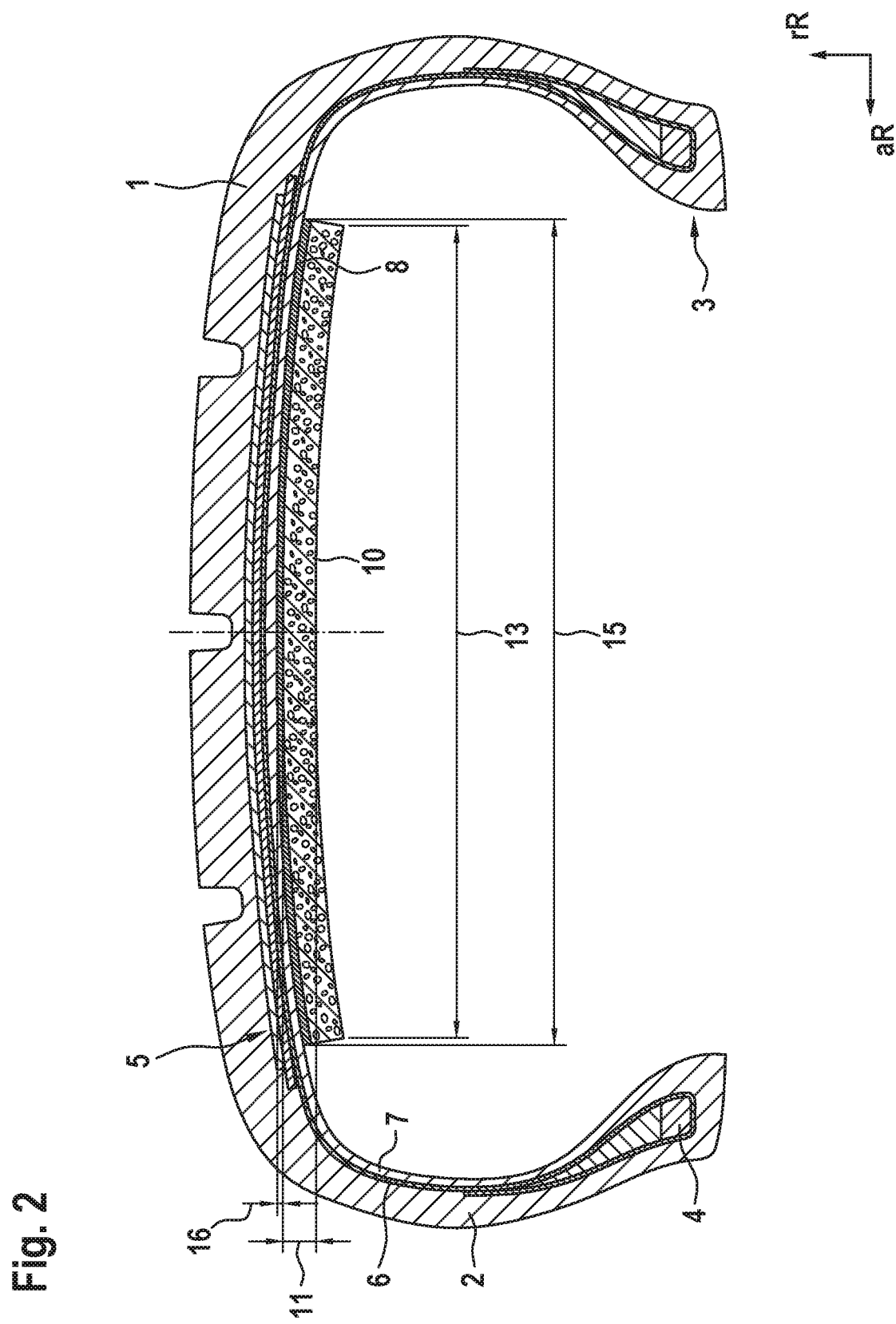
FIG. 2 shows a cross section through a pneumatic vehicle tire according to the invention.

FIG. 2 shows a cross section through a pneumatic vehicle tire according to the invention. The pneumatic vehicle tire according to the invention differs from the prior-art pneumatic vehicle tire of FIG. 1 in that a closed-cell material ring 10, here a closed-cell foam ring 10, with an airtight effect is arranged on the sealant 8.

The closed-cell material ring 10 has an approximately rectangular cross section. The closed-cell material ring 10 rests with its radially outer surface fully flush on the sealant 8. The width 13 of the closed-cell foam ring 10 corresponds approximately to the width 15 of the sealant 8. The closed-cell foam ring 10 has a thickness 11 of approximately 30 mm, measured in the radial direction (rR). The sealant 8 is a polyurethane gel. The sealant 8 has a thickness of 2 mm. According to the invention, the closed-cell foam ring 10 lying directly on the sealant 8 provides an airtight seal in the event of a puncture. This sealing by the closed-cell foam ring 10 has the effect of ensuring the sealing effect of the tire in cases of punctures and remaining air channels after expulsion of the penetrating item in spite of the sealant 8 having adversely affected flow characteristics.

Figure 3:
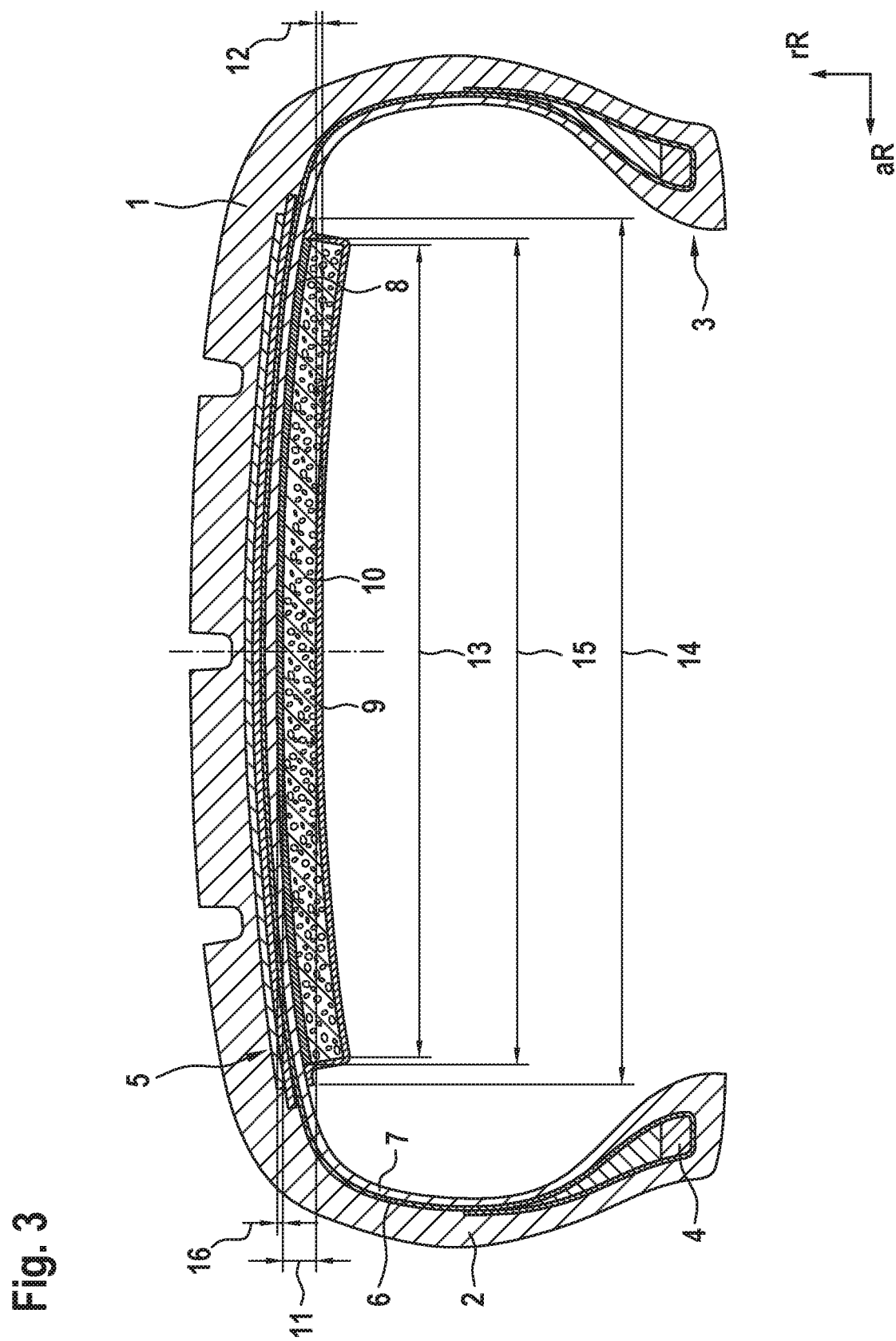
FIG. 3 shows a cross section through another pneumatic vehicle tire according to the invention.

FIG. 3 shows a cross section through another pneumatic vehicle tire according to the invention. The pneumatic vehicle tire of FIG. 3 differs from the pneumatic vehicle tire of FIG. 2 in that a covering film 9 covers the closed-cell foam ring 10 from the inside radially. The width 14 of the covering film is greater than the width 13 of the foam ring 10. The thickness 12 of the covering film is between 10 μm and 2 mm.

FIGS. 4 to 6 show cross sections of pneumatic vehicle tires according to the invention. The three embodiments show the material ring 10, which is supported on the sealant ply 8 by differently formed supports 19.

LIST OF DESIGNATIONS

1 . . . Tread
2 . . . Sidewall
3 . . . Bead region
4 . . . Bead core
5 . . . Belt assembly
6 . . . Carcass insert
7 . . . Inner layer
8 . . . Sealant ply
9 . . . Covering film
10 . . . Closed-cell foam ring
11 . . . Thickness of the closed-cell foam ring
12 . . . Thickness of the covering film
13 . . . Width of the closed-cell foam ring
14 . . . Width of the covering film
15 . . . Width of the sealant ply
16 . . . Thickness of the sealant ply
19 . . . Support

The invention claimed is:

1. A pneumatic vehicle tire comprising a material ring therein which is adhesively attached to an inner surface and opposite from a tread of the pneumatic vehicle tire, wherein the material ring is adhered to a self-sealing sealant which at least immediately after its application has a tackiness required for the adhesive attachment of the material ring, wherein the material ring arranged on the sealant is closed-cell material ring which is airtight, wherein the closed-cell material ring is covered with a covering film, wherein the closed-cell material ring is supported on the self-sealing sealant by means of two or more supports, and wherein the two or more supports are in direct contact with the self-sealing layer and the remainder of the ring is spaced from said self-sealing layer.

2. The pneumatic vehicle tire as claimed in claim 1, wherein the closed-cell material ring comprises one or more of foam, cork, or elastomer.

3. The pneumatic vehicle tire as claimed in claim 1, wherein the covering film is bonded, by means of an adhesive, to the closed-cell material ring, a tire inner layer, or, the closed- cell material ring and the tire inner layer.

4. The pneumatic vehicle tire as claimed in claim 1, wherein the closed-cell material ring has a maximum radial thickness of ≤50 mm.

5. The pneumatic vehicle tire as claimed in claim 1, wherein the covering film has a radial thickness of from 10 μm to 2 mm.

6. The pneumatic vehicle tire as claimed in claim 1, wherein the self-sealing sealant is a polyurethane gel, or, a viscous mixture based on butyl rubber, a polybutene, or a silicone.

7. The pneumatic vehicle tire as claimed in claim 1, wherein the closed-cell material ring lies with its radially outer surface fully flush on the self-sealing sealant and lies with its radially inner surface fully flush up against the covering film, and wherein a width of the closed-cell material ring corresponds approximately to a width of a ply formed of the self-sealing sealant.

8. The pneumatic vehicle tire as claimed in claim 1, wherein the closed-cell material ring lies with its radially outer surface fully flush on the self-sealing sealant and lies with its radially inner surface fully flush up against the covering film, and wherein width of the covering film is greater than the width of the self-sealing sealant, width of the closed-cell material ring, or, width of the self-sealing sealant and the closed-cell material ring.

9. The pneumatic vehicle tire as claimed in claim 1, wherein the covering film is formed from a material selected from the group consisting of rubber, butyl rubber, polyester, polyurethane, polyamide, polyethylene, polypropylene, polyvinyl chloride, polystyrene, biopolymers, and combinations thereof.

10. The pneumatic vehicle tire as claimed in claim 1, wherein the covering film is applied by spraying on a liquid material into the tire.

11. The pneumatic vehicle tire as claimed in claim 1, wherein the covering film is highly stretchable and the closed-cell material ring serves as a spacer between the tire and the covering film.

* * * * *